L. T. PEARSALL.
VALVE.
APPLICATION FILED JUNE 17, 1916.

1,279,900.

Patented Sept. 24, 1918.

WITNESSES
Roland T. Williams.
Lloyd W. Patch

INVENTOR
Luther T. Pearsall
BY Richard Bowen.
ATTORNEY

UNITED STATES PATENT OFFICE.

LUTHER T. PEARSALL, OF DANSVILLE, NEW YORK.

VALVE.

1,279,900.   Specification of Letters Patent.   Patented Sept. 24, 1918.

Application filed June 17, 1916.   Serial No. 104,293.

*To all whom it may concern:*

Be it known that I, LUTHER T. PEARSALL, a citizen of the United States, residing at Dansville, in the county of Livingston and State of New York, have invented certain new and useful Improvements in Valves, of which the following is a specification.

My invention relates to an improvement in valves, and more particularly to rotary valves such as are adaptable for use in steam lines or in other fluid supply lines where a quick acting and positive valve is required.

An object of my invention is to provide a throttling valve having a full straight-way port opening, which is so arranged that possible leakage is eliminated, and at the same time there is no possibility of the valve port or the working parts becoming clogged even when the valve structure has been in use for a considerable period of time.

A futher object lies in so constructing the parts of the valve that the valve proper may be readily operated under any pressure, thus obviating the necessity of the use of balanced valves, and to provide means by which the operation of the valve may be accomplished.

With the above and other objects in view, my invention consists in certain novel features of construction and combinations of parts which will be hereinafter set forth in connection with the drawings and then more particularly pointed out in the claim.

Figure 1:
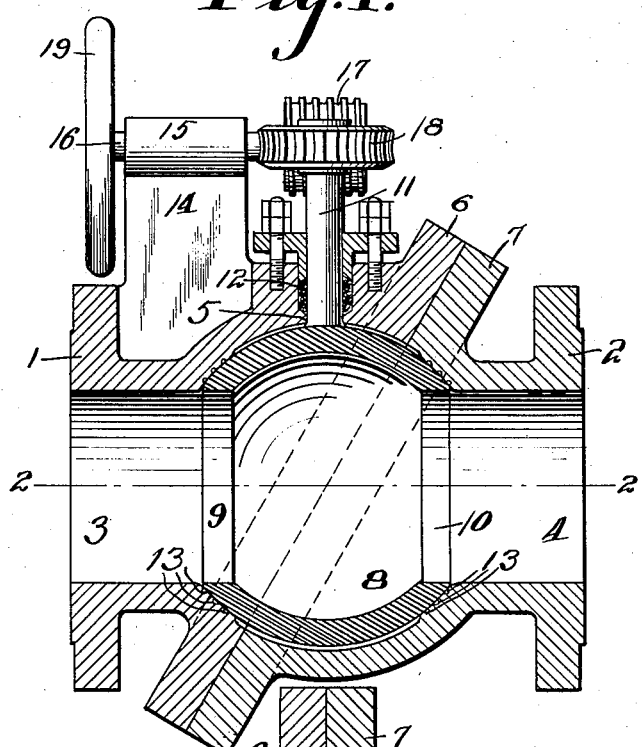
Figure 1 is a longitudinal vertical sectional view through the valve structure.

The valve casing which consists of the members 1 and 2 is shaped so that a substantially globular body is provided, with the branches 3 and 4 leading through the ends of the members 1 and 2. As is illustrated in Fig. 1, the member 1 is provided with a valve stem opening 5 and this member on the face which is adapted to be connected with the member 2 is cut obliquely across so that the valve stem opening 5 may be formed through the solid metal of the member 1, and also sufficient clearance is provided at the opposite side of the member that the valve to be hereinafter described can be readily fitted therethrough. The members 1 and 2 have the extending flanges 6 and 7 which may be bolted or otherwise secured together to hold the members in a rigid mounting, and it will of course be understood that it is desirable that the connection between the members 1 and 2 be made fluid tight.

The valve, which is generally indicated at 8, is made in the form of a hollow sphere and at opposite points is cut through to form the fluid passages 9 and 10. A valve stem 11 is formed in conjunction with the spherical valve 8 and when the members 1 and 2 of the case are disassembled this stem 11 may be fitted through the valve stem opening 5 of the member 1 and the valve 8 may be brought to the proper seated relation in the globular body portion of this member 1 after which the member 2 may be brought to the proper relation and secured in place to complete the globular body around the valve. A suitable stuffing box is provided at 12 around the valve stem 11, and thus the fluid tight closing of the globular valve body may be maintained while the stem 11 is permitted to have turning movement to shift the valve. The case members 1 and 2 have the annular water grooves 13 formed in the globular inner cavities thereof adjacent to the branches 3 and 4, which serve to close passage around the valve 8.

Figure 2:
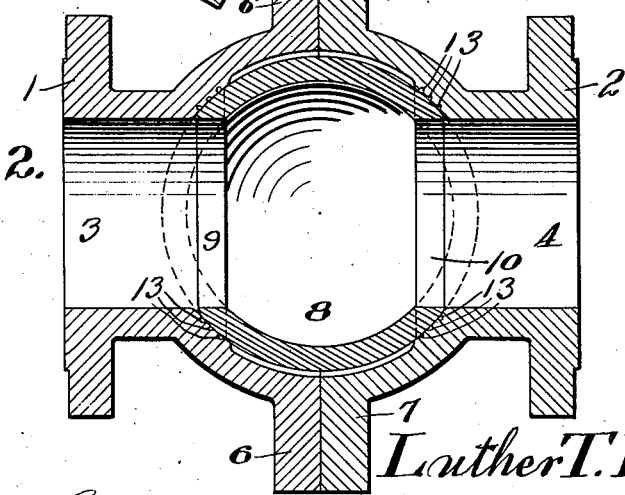
Fig. 2 is a sectional view taken on the line 2—2 of Fig. 1.

A bracket member 14 is extended upwardly from the casing member 1 and at its upper end is provided with a bearing 15 which bearing is slightly offset from the line of center of the stem 11 and is disposed at right angles thereto. A shaft 16 is mounted through this bearing and its inner end is provided with a worm 17 which meshes with a worm gear 18 secured on the upper end of the stem 11. A hand wheel 19 is provided on the shaft 16, and thus by turning of this hand wheel the shaft 16 and consequently the worm 17 will be turned. Through the mesh of the worm 17 with the worm gear 18, turning movement will be transmitted to the valve stem 11 by reason of the fact that this stem is secured rigidly in conjunction with the valve 8, the valve will be turned in one direction or the other as the hand wheel may be turned, and consequently the fluid passages 9 and 10 will be swung into or moved from registry with the branches 3 and 4 of the casing members 1 and 2. To entirely close the valve to cut off communication between the branches 3 and 4, the hand wheel 19 will be turned sufficiently to swing the valve 8 through an angle of 90° from the relation shown in Fig. 2, and this will bring the axis of the port openings or passages 9 and 10 through the spherical valve 8 to a position at right angles to the axis of the passage or branches 3 and 4 through the valve body members, thereby completely obstructing the passage to the valve body or casing. The water grooves 13 will act to effectually prevent leakage around the valve, and as movement of the valve is accomplished by means of the hand wheel and the valve is swung to one side or the other the size of the opening through the valve will be varied due to the partial closing of the passages 9 and 10, thus regulating the flow through the valve, and at the same time by reason of the fact that the worm and worm gearing are used to accomplish turning of the valve 8, the valve will be positively held in the position to which it may be adjusted, either full open, full closed or throttling or until manual readjustment is made.

While I have herein shown and described only one specific form of the device, it will be understood that the construction and the arrangement of the parts of the casing might be changed and that other variations and modifications might be resorted to without departing from the spirit and scope of my invention, and hence I do not wish to be limited to the exact disclosure but only to such points as may be set forth in the claim.

I claim:

As a new article of manufacture a valve comprising a two part casing provided with a globular valve cavity formed therein having inlet and outlet ports, each part of said casing provided with a flange, said flanges fitting together on a line taken diagonally across the passage through said casing, a spherical valve member having a fluid passage therethrough shaped to be fitted to turn in said globular cavity, a stem carried by said valve member, one of the parts of said casing provided with a stem receiving opening, a packing placed therein and fitting around said stem, said casing provided with a plurality of annular water grooves formed upon the inner face of said cavity near the inlet and outlet ports thereof, against which said valve member rests, and said packing constituting a fluid seal for preventing leakage of the fluid around the valve member in the direction of the normal flow.

In testimony whereof I affix my signature in presence of two witnesses.

LUTHER T. PEARSALL.

Witnesses:
HENRY MORSE PICKARD,
ELMER ATWOOD LAWRENCE.